United States Patent [19]
Ricard

[11] Patent Number: 5,862,895
[45] Date of Patent: Jan. 26, 1999

[54] ADJUSTABLE VARIABLE OLEOPNEUMATIC SHOCK-ABSORBING DEVICE

[76] Inventor: André Ricard, 1481 Route de Saint-Saturnin, 73000 Bassens, France

[21] Appl. No.: 700,399
[22] PCT Filed: Mar. 17, 1994
[86] PCT No.: PCT/FR94/00294
§ 371 Date: Aug. 29, 1996
§ 102(e) Date: Aug. 29, 1996
[87] PCT Pub. No.: WO95/25232
PCT Pub. Date: Sep. 21, 1995
[51] Int. Cl.$^6$ .................................. F16F 9/48; F16F 9/46; F16F 9/43
[52] U.S. Cl. ................. 188/289; 188/287; 188/298; 267/64.25
[58] Field of Search ................... 188/287, 289, 188/314; 267/64.22, 64.25; 280/276, 279

[56] References Cited

U.S. PATENT DOCUMENTS

| | | | |
|---|---|---|---|
| 2,148,497 | 2/1939 | Peck . | |
| 2,212,541 | 8/1940 | Isaacson . | |
| 2,423,736 | 7/1947 | Tack | 188/289 |
| 2,959,410 | 11/1960 | Fullam et al. . | |
| 3,189,133 | 6/1965 | Dillenburger | 188/298 |
| 3,215,283 | 11/1965 | Shaver | 188/289 |
| 3,445,103 | 5/1969 | Hennells . | |
| 3,525,449 | 8/1970 | Zanow | 188/289 |
| 3,744,599 | 7/1973 | Tresch et al. | 188/298 |
| 3,858,863 | 1/1975 | Mazelsky | 267/139 |
| 4,342,447 | 8/1982 | Marx | 188/298 |
| 4,452,437 | 6/1984 | Lochuer | 188/289 |
| 4,595,179 | 6/1986 | Glabiszewski | 188/274 |
| 4,623,049 | 11/1986 | Warren . | |
| 5,220,706 | 6/1993 | Bivens | 188/282.8 |

FOREIGN PATENT DOCUMENTS

| | | |
|---|---|---|
| 1004261 | 3/1952 | France . |
| 1402818 | 5/1965 | France . |
| 2418392 | 9/1979 | France . |
| 1780323 | 12/1971 | Germany . |
| 3249313 | 7/1984 | Germany . |
| 533048 | 2/1941 | United Kingdom . |

OTHER PUBLICATIONS

Patent Abstracts of Japan, vol. 7, No. 177 (M–233) (1322) 5, Aug. 1983 & JP, A58 081 241 (Atsugi Jidoushiya Buhin KK) 16, May, 1983.

Primary Examiner—R. Oberleitner
Assistant Examiner—Chris Schwartz
Attorney, Agent, or Firm—Wall Marjamn Bilinski & Burr

[57] ABSTRACT

An oleopneumatic shock absorbing device including a hydraulic fluid-filled cylinder (1) combined with a movable assembly moved by outside forces for circulating the hydraulic fluid. The movable assembly consists of a hollow mobile piston (3) on the end of a push rod (2) with an internal longitudinal space (13) forming a reservoir for the hydraulic fluid. When the piston (3) and the push rod (2) are moved, the fluid flows through a variable flow-rate transfer channel (11) providing variable, e.g. gradual shock absorption throughout both the outward stroke and the return stroke.

9 Claims, 4 Drawing Sheets

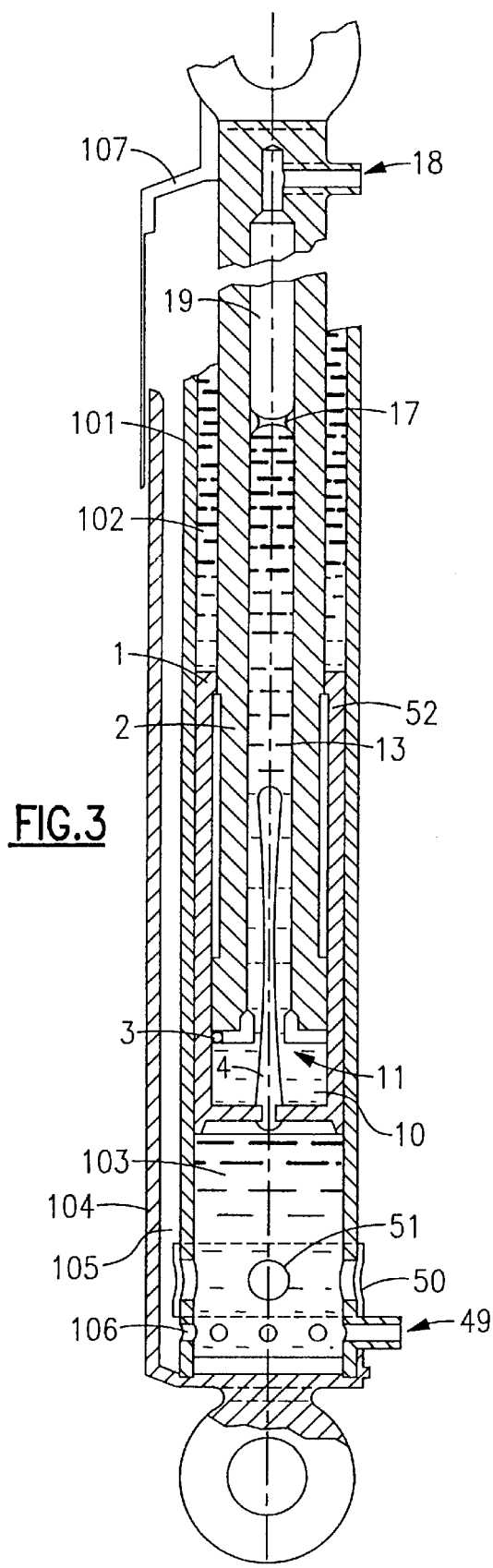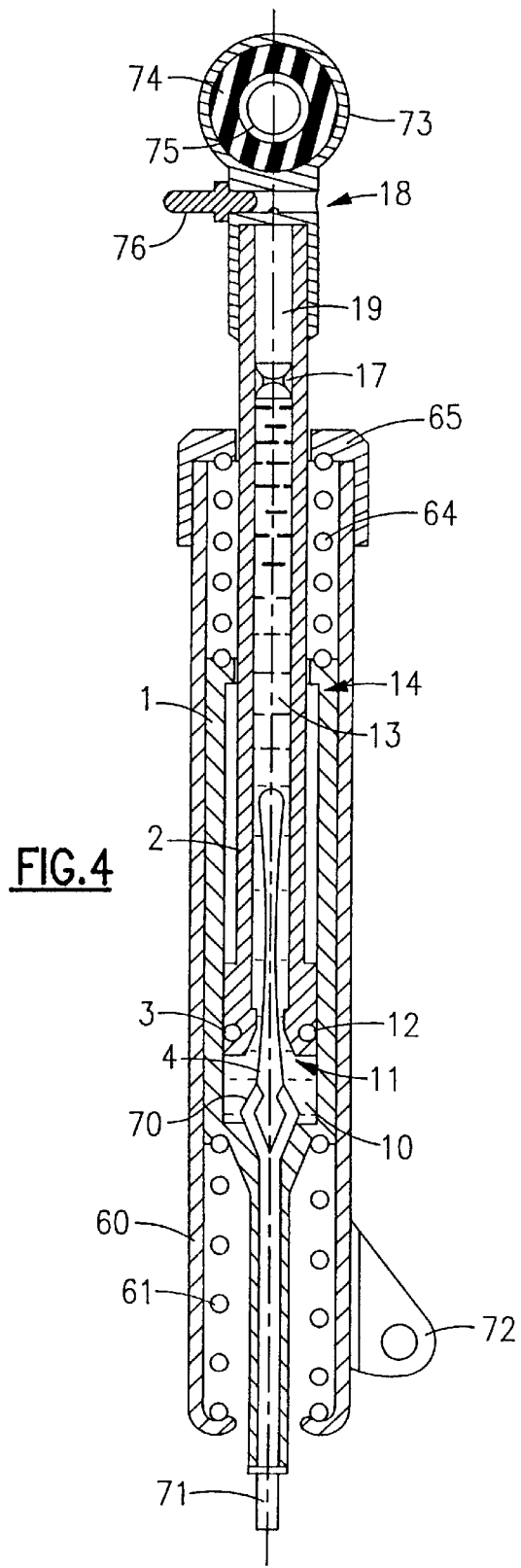

ADJUSTABLE VARIABLE OLEOPNEUMATIC SHOCK-ABSORBING DEVICE

BACKGROUND OF THE INVENTION

The present invention relates to a new variable oleopneumatic shock absorbing device with the possibilty for adjustment, which can be used not only to produce suspension for vehicles such as automobiles, motorcycles and bicycles, but can also be used in all installations requiring the use of a shock absorbing system, such as industrial, agricultural and civil engineering works machinery and tooling, trucks, trailers, lifting and handling gear, and opening or closing systems.

Oleopneumatic shock-absorbing devices are well known and are used in many technical fields.

The solutions put forward to date are, however, relatively complicated, highly sensitive to wear, rapidly lose their effectiveness and often allow shock absorption to be obtained in just one direction. Furthermore, the degree of shock absorption is generally determined at the time of manufacture and it is difficult to effect individual adjustment as required and, more importantly, to effect such an adjustment even during operation.

Now, there has been found, and this is what forms the subject-matter of the present invention, a simple solution which makes it possible to solve these problems, which solution can be used either alone or be incorporated into shock-absorbing and/or suspension assemblies.

Oleopneumatic shock-absorbing devices in general consist of an assembly which is intended to be interposed between a bearing element and a part to be suspended, and essentially includes a cylinder filled with a fluid (for example oil) connected to the bearing element (or to the element to be suspended), and inside which there can move a piston, the rod of which is connected to the bearing element (or to the part to be suspended). The piston has calibrated nozzles equipped with check valves which makes it possible, as the said piston moves, to slow the movements, for example the oscillations of the suspension, to a greater or lesser extent. Furthermore, the piston also contains a second piston known as a "free piston", which allows the definition within the cylinder of a chamber containing a pressurized gas (for example nitrogen).

As indicated earlier, such oleopneumatic shock absorbers are of a complicated design, lose their qualities as soon as they are slightly worn, and do not always make it possible to obtain effective shock absorption, this being the case both in the outward stroke and in the return stroke, nor do they allow adjustment during operation. Furthermore, current shock absorbers attenuate vibration, but this vibration still remains troublesome. Furthermore, the travel engendered by defects of the highway are not well absorbed.

SUMMARY OF THE INVENTION

The device according to the invention makes it possible to solve these problems.

In general, the device according to the invention comprises a body or cylinder filled with hydraulic fluid (for example oil), with which there is associated an assembly that can move under the action of external forces and which allows the hydraulic fluid to be made to circulate upon relative movements between these two parts, and it is characterized in that:

the movable assembly consists of a hollow mobile piston, the action of which drives along the hydraulic fluid, this piston, the periphery of which slides against the internal wall of the body or cylinder, being mounted at the end of a rod or push rod including a longitudinal cavity allowing the formation of a reservoir for the hydraulic fluid, the said cavity at the opposite end to its open end containing an element known as a "free piston" separating the said hydraulic fluid from a reserve of gas;

the circulation of the fluid upon the movement of the piston/push rod under the action of a force takes place between the chamber defined by the internal wall of the cylinder and the longitudinal cavity of the push rod, through a transfer channel with variable flow-rate defined by the internal cross section of the piston and the external surface of a "regulator" element consisting of a rod of variable cross section, the base of which is joined to the body or cylinder of the assembly, and the external profile of which is such that upon interpenetration of the said regulator in the internal cavity of the piston allows the cross section of the annular space taken up by the liquid upon relative movements of the push rod with respect to the body/regulator assembly to be varied, this variation in cross section giving shock absorption which is variable, for example gradual throughout the stroke, this being true both in the outward stroke and in the return stroke;

the free piston making it possible to compensate for the differences in volume which are due to the movement of the elements of the device.

Furthermore, in accordance with the invention, the chamber containing the gas is equipped with a valve, for example of the "valve for bicycle inner tube" type, thus making it possible, with the aid of a pump, to adjust the desired suspension softness.

What is more, the shock-absorbing effect can be improved by arranging a pneumatic "cushion" or equivalent element such as a compressible block between the piston and the end of the body.

Means are moreover provided for preventing the push rod from rotating inside the body, these means consisting, for example, of a groove on the external face of the push rod, in which groove there slides a shoe integral with the body, this groove delimiting the stroke.

The shape of the cross section of the body and of the push rod piston may be either cylindrical, or some other shape, for example oval, or multifaceted, so as to allow translational movement of the moving parts while preventing them from rotating one with respect to the other. In such a case, the stroke is limited by a stop consisting of a component integral with the body, and its top part is stepped in order to prevent the push rod from coming out of its housing.

BRIEF DESCRIPTION OF THE DRAWINGS

The invention and the advantages it affords will, however, be better understood by virtue of the embodiment examples given hereafter by way of nonlimiting indication, and illustrated by the attached diagrams in which:

FIG. 3 illustrates the application of such a device as a piston of a conventional shock absorber;

FIG. 4 illustrates another application of a device according to the invention as a flameproofing contact element built into a safety system;

DESCRIPTION OF THE INVENTION

Figure 1:
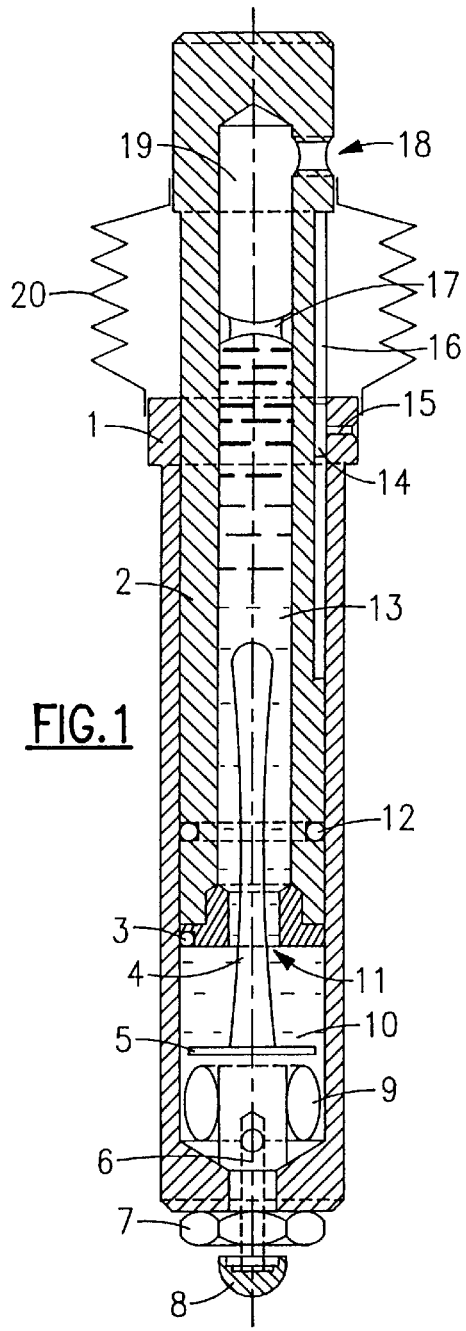
FIG. 1 illustrates, viewed in section, the overall structure of a preferential embodiment of a double-acting progressive oleopneumatic shock-absorbing device, with the possibility of adjustment produced in accordance with the invention.

If reference is made to the attached diagrams, and more particularly to FIG. 1, the device in accordance with the invention is therefore composed essentially of a body (1) in which there slides a rod or push rod (2) integral with a hollow piston (3), sealing advantageously being obtained by a seal (12). A regulator (4) with a shape appropriate to the desired shock-absorption curve progressively limits the flow rate of fluid situated in the reserve (10) of the body (1) through the transfer channel (11) to fill or empty the chamber (13), which has the effect of acting on the free piston (17) which causes the volume and pressure of the gas contained in the reserve (19) to vary. A valve (18) allows filling or emptying of gas.

In this embodiment, translational guidance is obtained by a shoe (14) which slides in a groove (16) on the push rod (2), preventing rotation of the body (1) and push rod (2) assembly. A screw (15) holds the shoe (14) in place, and this determines the translational stroke and prevents any possibility of the push rod coming out of the body (1). An internal passage (6) allows the filling and/or emptying of hydraulic fluid without dismantling the device. A plug (8) allows the exit of the channel (6) to be closed off. An additional damping cushion (9) is held in position inside the body by virtue of a washer (5). A gaiter (20) prevents contact with foreign bodies, dust, water etc. A nut (7) fastens the regulator (4) to the body (1). Since the piston/push rod (3)/(2) assembly and the regulator (4) are never in contact, there is therefore no wearing of these components.

Such an assembly with a particularly simple design makes it possible to obtain progressive double-acting shock absorption and this is essentially by virtue of the regulator (4) which constitutes the master component in such a device, a component which is of simple design, easy to produce with conventional machines. This regulator (4) depending on its shape, allows variable shock absorption to be obtained. For example, the shape of the regulator (4) illustrated in FIG. 1 makes it possible to have the maximum softness when the piston is in the middle position, the annular space (11) there being the greatest and, on each side of this middle position, to give progressive shock absorption, becoming increasingly hard towards the end of the stroke, this being true both in one direction and in the other. By varying the shape of the regulator (4) it is thus possible to obtain different shock-absorption curves depending on the requirements and applications.

The relative position of the regulator (4) and of the piston (3)/push rod (2) allows, in the central part of the stroke, a maximum amount of fluid to pass; during interpenetration of these two elements, as the cross section of the transfer channel (11) decreases, the liquid circulates less easily, which slows down the movement; as the piston approaches the ends of the regulator, the movement is slowed down more and more until stopped by closure of the transfer channel (11).

Furthermore, the shock absorption is obtained without the components causing it being in contact, therefore without wear. This design of the device gives it very great longevity while at the same time keeping all its initial characteristics.

As far as the hydraulic fluid is concerned, a choice of viscosity makes it possible, for one and the same regulator shape, to obtain shock absorption of greater or lesser hardness.

The pneumatic part consisting of the cushion (9) makes it possible to absorb powerful shocks and to restore this energy progressively in concord with the effect of the regulator (4). The other pneumatic part consisting of the reserve (19) situated in the push rod (2) makes it possible to adjust the device as a function of the load. This way of mounting also makes it possible to compensate for differences in volume internal to the system, resulting from the relative piston/push rod/regulator movements.

Figure 2:
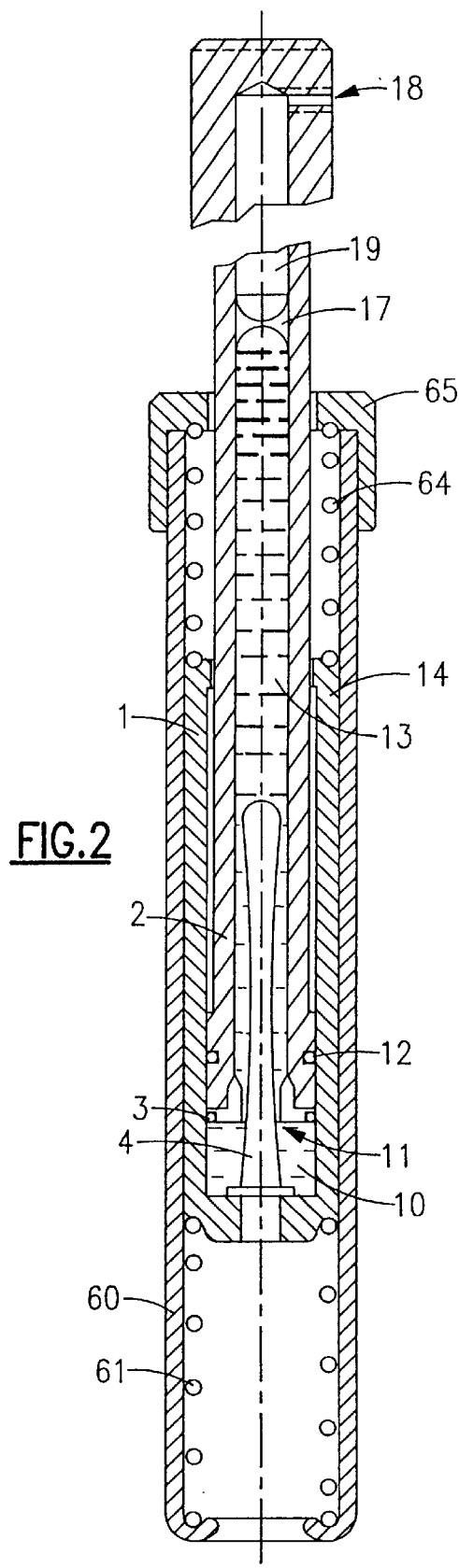
FIG. 2 illustrates the application of such a device as a shock-absorbing element built into an existing bicycle or motorcycle seat tube.

Such an assembly may be used in many applications, for example to produce a bicycle or motorcycle saddle shock-absorbing system. In this case, it can be used as it is, by mounting it in place of the seat tube itself or, as illustrated in FIG. 2, by incorporating it into the tube (60) of such a saddle. In this case, the device is incorporated inside the post (60) and is held between two deformable stops (61) and (64) by means of a plug (65). Such a method of mounting makes it possible to absorb even greater shocks.

In such an application, when the user sitting on his vehicle, the saddle of which is fixed to the push rod (2), comes across an uneven piece of ground, for example a bump, at the moment the obstacle is encountered there is a shock absorbed in part by the wheel and the rest of the vehicle; however, the latter is pushed upward. It is at this moment that the device comes into play, allowing the rider to be held as close as possible to the ideal trajectory with the least possible jolting. When the obstacle is encountered the frame is deflected upward, carrying along with it the body (1) of the device which is integral with it, while the rider-saddle-push rod (2)-piston (3) assembly opposes this movement which, at the same time, compresses the gas contained in the chamber (19) allowing the pressurized fluid contained in the reserve (10) of the body (1) to be driven into the hollow part (13) of the push rod (2) via the transfer channel (11), the flow-rate of which varies as a function of the relative piston (3)/regulator (4) position and depending on the predetermined profile of this regulator, thus giving variable shock absorption which can be varied as a function of its profile, its shape, without the piston (3)-push rod (2) coming into contact with the regulator (4) and therefore without wear. Thus, according to the preferential shape of the regulator (4) of the device according to the invention: when the regulator integral with the body (1) nears the piston (3) approaching bottom dead center, the fluid which has to pass between the piston (3) and regulator (4) is slowed down by the increase in the cross section of the latter, which causes a progressive slowing down of the stroke to stationary. At the same time, the fluid partially fills the chamber (13) of the push rod (2) compressing the gas via the free piston (17). In the next phase: descent from the obstacle in order to maintain or return to the ideal trajectory, the piston (3)-push rod (2)-saddle-rider assembly is freed of the thrust of the frame to which the body (1) of the device is fixed; the compressed gas expands using the free piston (17) to push back the liquid contained in the chamber (13) of the push rod (3), driving it toward the bottom part of the body, accompanying and pushing upward the piston-push rod-saddle-rider assembly with a movement which will gradually diminish as far as the position of optimum comfort for the rider; the comfort being obtained by individual adjustment of the gas pressure. The comfort position will not be changed until the device is acted upon again.

FIG. 3 illustrates another application of the device which is used to be substituted for a conventional piston of an existing assembly such as, for example, a conventional shock absorber. The body (1) of the device thus constitutes the outside of the "sliding piston", which can move in the internal cylinder (101) of the existing device and thus allows progressive double-acting shock absorption to be obtained at all points along the stroke.

In this embodiment, a stop (52) is placed on the sliding piston (1) and limits the translational stroke of the push rod (2).

As the entire device is immersed in the hydraulic fluid of the existing system, the "sliding piston" has, on its external surface, passages gaging the flow of fluid between the lower chamber (103) and the upper chamber (102), making it possible to obtain the uniform distribution of the contacting surfaces of the perimeter of this sliding piston. At the bottom of the inner cylinder (101) there are transfer passages (106) allowing the hydraulic fluid to circulate from the chamber (103) toward the reserve (105) or toward the collecting pipe (49) and vice versa, the latter reserve being contained within the outer tube (104) which is capped with a dust protector (107). A discharge valve formed of a ring (50) which can deform in the event of overpressure in the reserve (103) allows an additional amount of fluid to escape from the cylinder (101) via the orifices (51), thus constituting a safety member.

Such a device can be mounted inside any piece of apparatus, suspension, ram, etc., and thus constitute a built-in shock absorber. As all the parts are very well lubricated, and such an assembly does not require any additional seal, this makes it possible to obtain very high reliability. It is in this application that the device provides a substantial improvement in the absorption of vibration; it cancels out medium-intensity shocks.

FIG. 4 illustrates, viewed in diagrammatic section, another type of application of the assembly in accordance with the invention for achieving, in addition to the shock-absorbing effect, the function of a flameproofing contact for a safety system, for example cutting off electrical current as soon as an inspection hatch is opened.

In this application, and as illustrated in this figure, the device according to the invention is installed between two elastic supports (61) and (64). The body (1) is made of a material which does not conduct electrical current and extends away from the push rod (2) in order to hold in place and to protect the conducting contact element (70) which is inserted therein, allowing a part forming the terminal (71) to protrude beyond its end. As before, mounted on the internal end of the push rod (2) is the piston (3) which, in this embodiment, also constitutes a contact component intended to come and touch the contact (70), thus making or breaking the electric circuit.

The hydraulic fluid situated in the reserve (10) is also dielectric, which prevents sparking as the contacts (3) (70) meet, these contacts being achieved perfectly by virtue of their complementary shapes. The body (1) is held in position with the aid of springs (61) (64), the latter lying on each side of the device, on one side resting against the spring cup of the tube of the casing (60), and on the other held in position by the threaded plug (65). The pressure on the contacts (3) and (70) can be adjusted by varying the distance between axes of the fixtures (72) (75) by adjusting the tension in the springs (61) (64), this adjustment being achieved by moving the threaded end fitting (65). The element (73) on which the terminal (76) is assembled is screwed on to the push rod (2). The central element (75) of the attachment is connected to the element (73) by an insulating core (74). For safety reasons, the regulator (4) crimped at its base in the contact conductor (70) is made of an insulating material. Likewise, the casing (60) may be covered with or constructed of insulating material.

Figure 5:
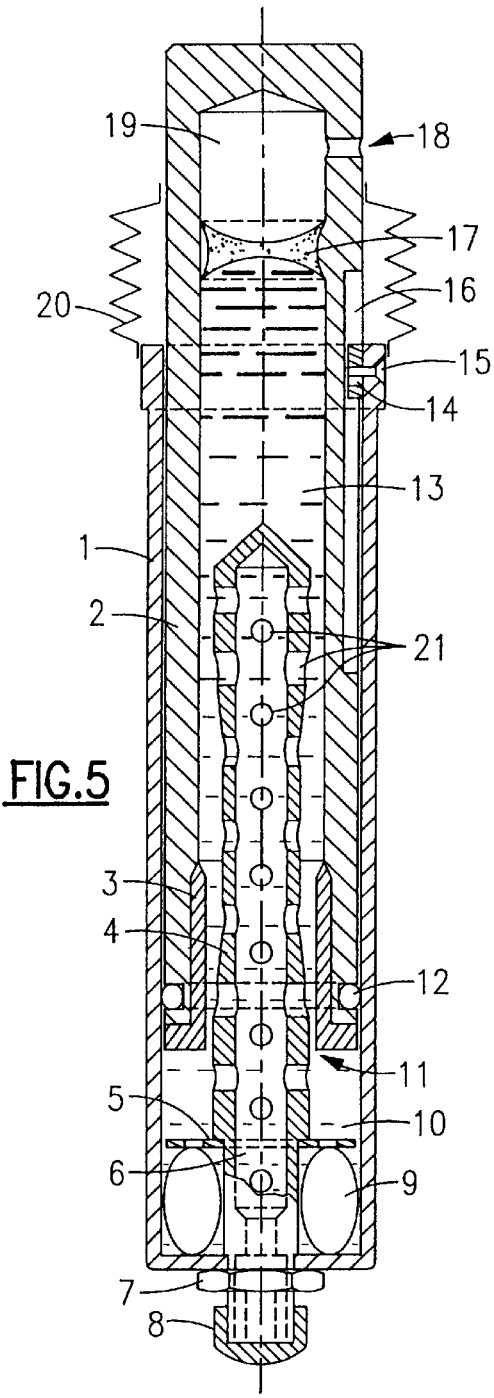
FIGS. 5, 6 and 7 illustrate various alternative forms of regulator which can be used in devices produced in accordance with the invention.
Figure 6:
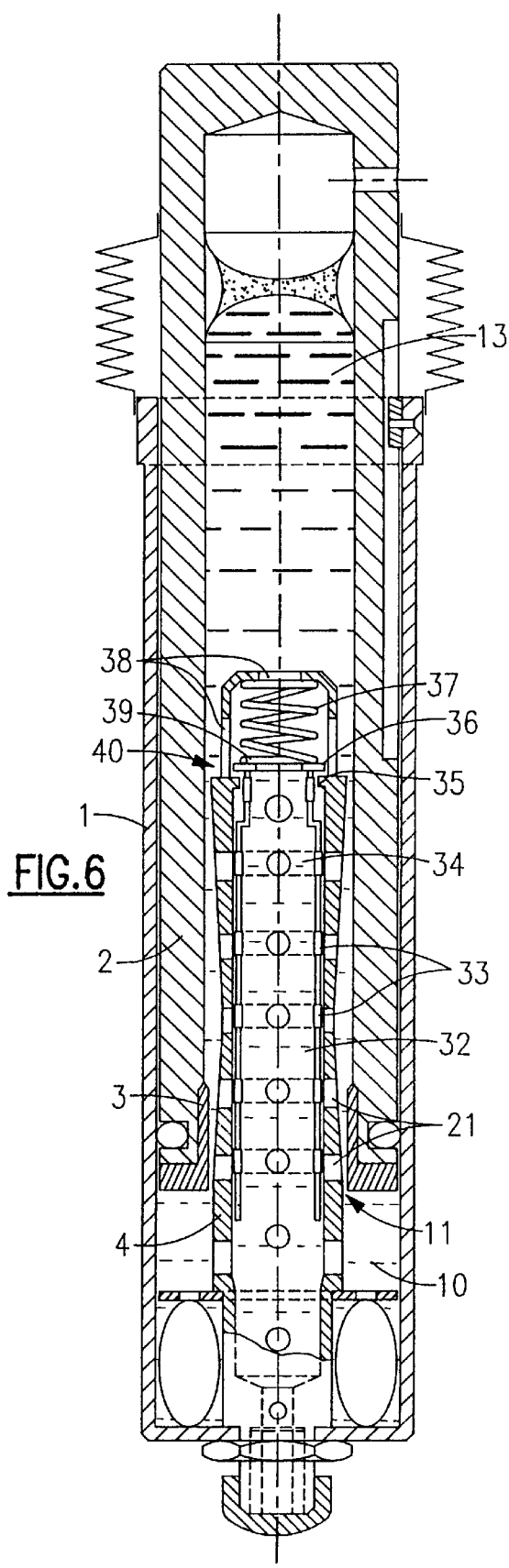
Figure 7:
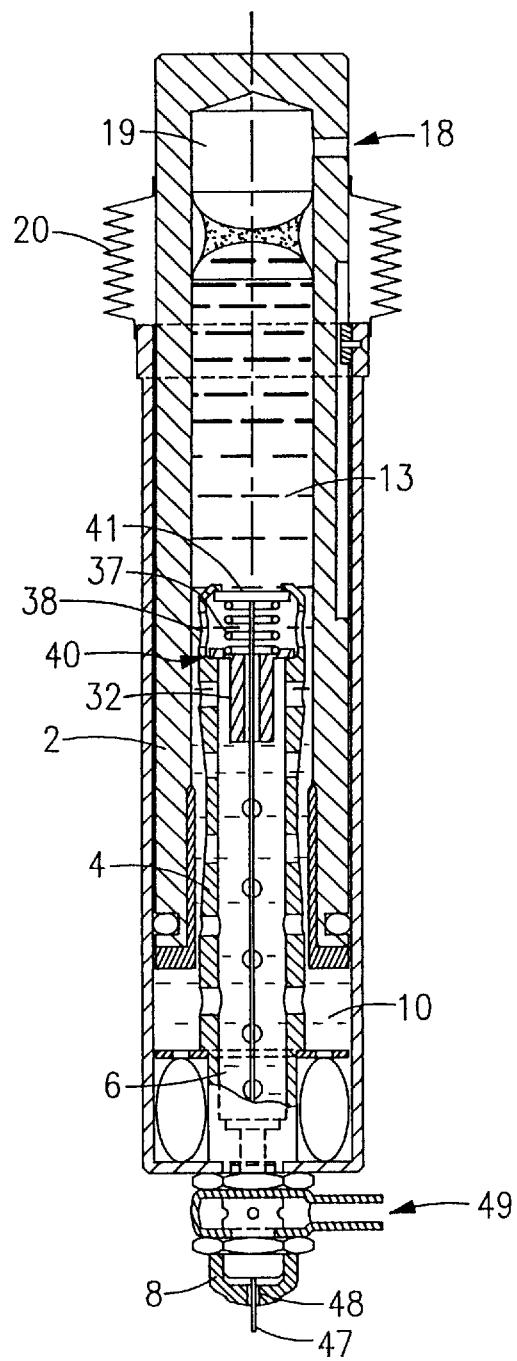

FIGS. 5, 6 and 7 illustrate three alternative forms of regulator (4) for a device in accordance with the invention.

In the first alternative form illustrated by FIG. 5, the regulator (4) includes in addition to the elements already described in the preferential embodiment illustrated by FIG. 1, ports (21) which allow the passage of fluid through the inside, which makes it possible to give an increase in weight for producing devices with a large size, making it possible to increase the amount of hydraulic fluid and also facilitating heat exchange.

In this embodiment, the regulator (4) consists of a hollow body with ports (21) allowing the fluid to pass from the reserve (10) to the chamber (13) and vice versa. In the middle part of the stroke, the flow rate of the transfer channel (11) is at a maximum, the ports (21) allowing optimum passage of fluid, which gives the device softness. When, in its stroke, the piston (3) nears the ends of the regulator (4), the ports (21) are progressively closed off, which provides a progressive slowing down.

In the alternative form illustrated by FIG. 6, a spool (32) automatically opens and closes the passage for the liquid as a function of forces and thus provides auto-adjustment; a preloaded spring (37) fixes the amount and forms a discharge valve.

In this embodiment, in the position of rest, the ports (33) of the spool (32) are in register with the ports (21) of the regulator. Grooves (34) allow free circulation of the fluid without the ports (33) of the spool (32) having to be rotated to face the ports (21) of the regulator (4).

In the rest position, the flange (36) of the spool (32) rests on the seat (35) of the regulator (4). A preloaded spring (37) keeps the flange (36) of the spool in place on its seat (35). When there is excessive thrust on the piston/push rod (3)/(2), the fluid cannot pass completely through the transfer channel (11) and the ports (21); it is at this moment that, under the pressure of the fluid coming from the reserve (10), the spool (32) actuates the discharge valve that the assembly (4)-(32)-(37) constitutes. The flange (36) of the spool (32) lifts off the seat (35) allowing an additional amount of fluid from the reserve (10) to circulate, via the passage (40). At the same time, the ports (33) of the spool (32) are moved and therefore are not perfectly in register with the ports (21) of the regulator (4), thus slowing down the passage of the fluid between the reserve (10) and the chamber (13). This action provides the auto-adjustment. The shock absorption in the return stroke is obtained by an amount of fluid contained in the chamber (13) and which is going back to the reserve (10) passing through the gaged ports (38) and (39).

In the alternative form illustrated by FIG. 7, a spring ((37) situated at the top of the regulator (4) forms a discharge valve. A through bolt (47) integral with a spring plate (41) allows the preload of the valve to be adjusted from the outside of the device, even during operation thereof.

A spring plate (41) integral with a through bolt (47) makes it possible to adjust the pressure of the spring (37) on the spool (32). Tension exerted on the through bolt (47) increases the resistance of the discharge valve (4, 32, 37, 41, 47) to the passage (40) of the hydraulic fluid as it is being transferred from the reserve (10) to the chamber (13), which has the effect of reinforcing the hardness of shock absorption.

A collector (49) makes it possible to fill or empty the desired amount of fluid even when the device is in use. Emerging holes made in the regulator allow the fluid to pass between the channel (6) thereof and the collector (49). A plug (8) allows the through bolt (47) to pass through; sealing is obtained by virtue of a seal (48) fitted with any suitable means.

The foregoing examples clearly show all the advantages afforded by the invention, among which there may be mentioned:

the obtaining of shock absorption which is variable by virtue of the specific shape of the regulator;

a shock-absorption effect which is obtained without wear to the parts;

very great simplicity of the device both in its design and in its use;

the possibility of individual adjustment possible even during operation;

ease of fitting to existing equipment.

Of course the invention is not limited to the embodiments described previously but covers all alternative forms thereof produced in the same spirit.

I claim:

1. An oleopneumatic shock absorbing apparatus that includes:

a cylindrical body member having a bottom wall for closing one end of said body member, said opposite end of said body member being open, an elongated push rod passing through said open opposite end and being slidably contained within said body member, said push rod having a longitudinal chamber passing upwardly through the bottom of said push rod so that the bottom of said push rod can move toward and away from the bottom wall of said body member, an annular seal mounted upon the bottom of said push rod that moves in sealing contact against the inner wall of said body member, a free floating piston mounted in said longitudinal chamber that separates the chamber into a gas cavity at the back of the chamber containing a gas and a fluid chamber at the front of the chamber containing a hydraulic oil, an elongated regulator element mounted upon the bottom wall of said body member and passing upwardly into said fluid chamber, said regulator element having a cross section that varies along its length and is minimum at an axial portion thereof that corresponds to a midpoint of the stroke of said push rod, wherein the diameter of the inner surface of said push rod is greater than the largest outer diameter of said regulator element, whereby movement of said push rod toward and away from the bottom wall of said body member provides shock absorption which is variable throughout the stroke of the push rod, both in the outward and return strokes, as a result of fluid flow through a space defined between the inner surface of said push rod and the outer surface of said regulator element.

2. The apparatus of claim 1, wherein said regulator element has primary ports for allowing fluid to pass through the inside of said regulator element between a fluid reservoir and said fluid chamber.

3. The apparatus of claim 2 that further includes an adjustable spool and a biasing spring for maintaining the spool in a neutral position and secondary metering ports which regulate the passage of fluid from a fluid reservoir formed in said body member to the fluid chamber when the spool is moved from the neutral position.

4. The apparatus of claim 3 that further includes a through bolt integral with a spring plate that passes upwardly through the bottom wall of the body member into said regulator element for preloading the biasing spring whereby the spring loading can be adjusted from outside the body member.

5. The apparatus of claim 1 that further includes a valve for adjusting the pressure within the gas chamber.

6. The apparatus of claim 1 that further includes a pneumatic cushion mounted inside said body member upon the bottom wall thereof, whereby the push rod will contact said cushion at the bottom of its stroke.

7. The apparatus of claim 1 that further includes means for preventing the push rod from rotating inside said cylindrical body member.

8. The apparatus of claim 1 wherein said regulator element includes a channel for allowing fluid to be filled or removed from the fluid cavity.

9. The apparatus of claim 1 that further includes a collector means mounted in said body member for adding or removing fluid from said body member, and means to connect said collector means to a fluid reservoir formed in said body member.

* * * * *